United States Patent
Halcom et al.

(10) Patent No.: US 8,888,396 B2
(45) Date of Patent: *Nov. 18, 2014

(54) SELF-RETAINING ANTI-ROTATION CLIP

(75) Inventors: Lancer D. Halcom, Lewisville, TX (US); Clifton B. Day, Weatherford, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/494,680

(22) Filed: Jun. 12, 2012

(65) Prior Publication Data

US 2012/0251224 A1  Oct. 4, 2012

Related U.S. Application Data

(62) Division of application No. 12/523,601, filed as application No. PCT/US2007/003597 on Feb. 9, 2007, now Pat. No. 8,197,153.

(51) Int. Cl.
*F16C 11/06* (2006.01)
*B64C 27/00* (2006.01)

(52) U.S. Cl.
CPC ....... *F16C 11/0614* (2013.01); *B64C 2027/002* (2013.01)
USPC ...................................... 403/143

(58) Field of Classification Search
USPC ......... 403/13, 14, 26, 79, 114, 115, 141–143, 403/149, 157–159, 162, 163, 397; 384/192, 384/206, 906; 244/17.11, 17.27
See application file for complete search history.

(56) References Cited

U.S. PATENT DOCUMENTS

| | | | | |
|---|---|---|---|---|
| 1,829,305 A | * | 10/1931 | Sneed | 74/579 R |
| 2,064,692 A | | 11/1935 | Shank | |
| 3,123,926 A | | 3/1964 | Jacobson | |
| 3,438,661 A | * | 4/1969 | Bowen | 403/77 |
| 3,614,182 A | * | 10/1971 | Rozentals | 384/207 |
| 3,746,408 A | * | 7/1973 | Wachter et al. | 384/207 |
| 3,759,589 A | * | 9/1973 | Rozentals | 384/207 |
| D236,020 S | * | 7/1975 | Wachter et al. | D15/143 |
| 4,043,617 A | * | 8/1977 | Cain et al. | 384/207 |
| 4,072,431 A | | 2/1978 | Waight et al. | |
| 4,139,245 A | | 2/1979 | McCloskey | |
| 4,678,350 A | * | 7/1987 | Statz | 384/208 |
| 4,776,720 A | | 10/1988 | Nolen | |

(Continued)

OTHER PUBLICATIONS

European Search Report dated Feb. 9, 2012 from counterpart EP Application No. 07750434.8.

(Continued)

*Primary Examiner* — Joshua Kennedy

(74) *Attorney, Agent, or Firm* — James E. Walton; Richard G. Eldredge

(57) ABSTRACT

A self-retaining anti-rotation clip for a spherical-bearing rod end has two opposing spacer plates, each spacer plate having a curved edge portion for surrounding at least a portion of a ball of the rod end. A connector plate connects the spacer plates, such that the spacer plates are spaced from each other and generally parallel to each other. Retaining means are carried on the clip and adapted for retaining each spacer plate in a position generally adjacent one side of a body of the rod end, such that the spacer plates are free from interference with the ball of the rod end.

6 Claims, 8 Drawing Sheets

(56) References Cited

U.S. PATENT DOCUMENTS

| | | | |
|---|---|---|---|
| 4,867,596 A | 9/1989 | Ocuin | |
| 5,058,829 A | 10/1991 | Bentley | |
| 5,129,148 A * | 7/1992 | Adams et al. | 29/898 |
| 5,203,522 A | 4/1993 | White et al. | |
| 5,277,860 A * | 1/1994 | Sinclair | 264/242 |
| 5,865,558 A * | 2/1999 | Cebollero | 403/133 |
| 5,961,264 A | 10/1999 | Postadan | |
| 5,979,592 A | 11/1999 | Delgado | |
| 6,296,203 B1 | 10/2001 | Manteiga et al. | |
| 6,371,681 B1 | 4/2002 | Covington et al. | |
| 6,483,035 B2 * | 11/2002 | Hasegawa et al. | 174/92 |
| 6,669,393 B2 | 12/2003 | Schilling | |
| 6,692,179 B2 * | 2/2004 | Bohne et al. | 403/141 |
| 6,902,342 B1 | 6/2005 | Ditzler | |
| 7,318,687 B2 | 1/2008 | Appleyard et al. | |
| 2005/0196227 A1 | 9/2005 | Mahy et al. | |

OTHER PUBLICATIONS

International Search Report dated Sep. 5, 2008 from counterpart PCT Application No. PCT/US07/03597.

Article 34 Amendment dated Jun. 25, 2009 from counterpart PCT Application No. PCT/US07/03597.

International Preliminary Report on Patentability dated Apr. 17, 2009 from counterpart PCT Application No. PCT/US07/03597.

Canadian Office Action dated Aug. 30, 2011 from counterpart CA Application No. 2,676,523.

* cited by examiner

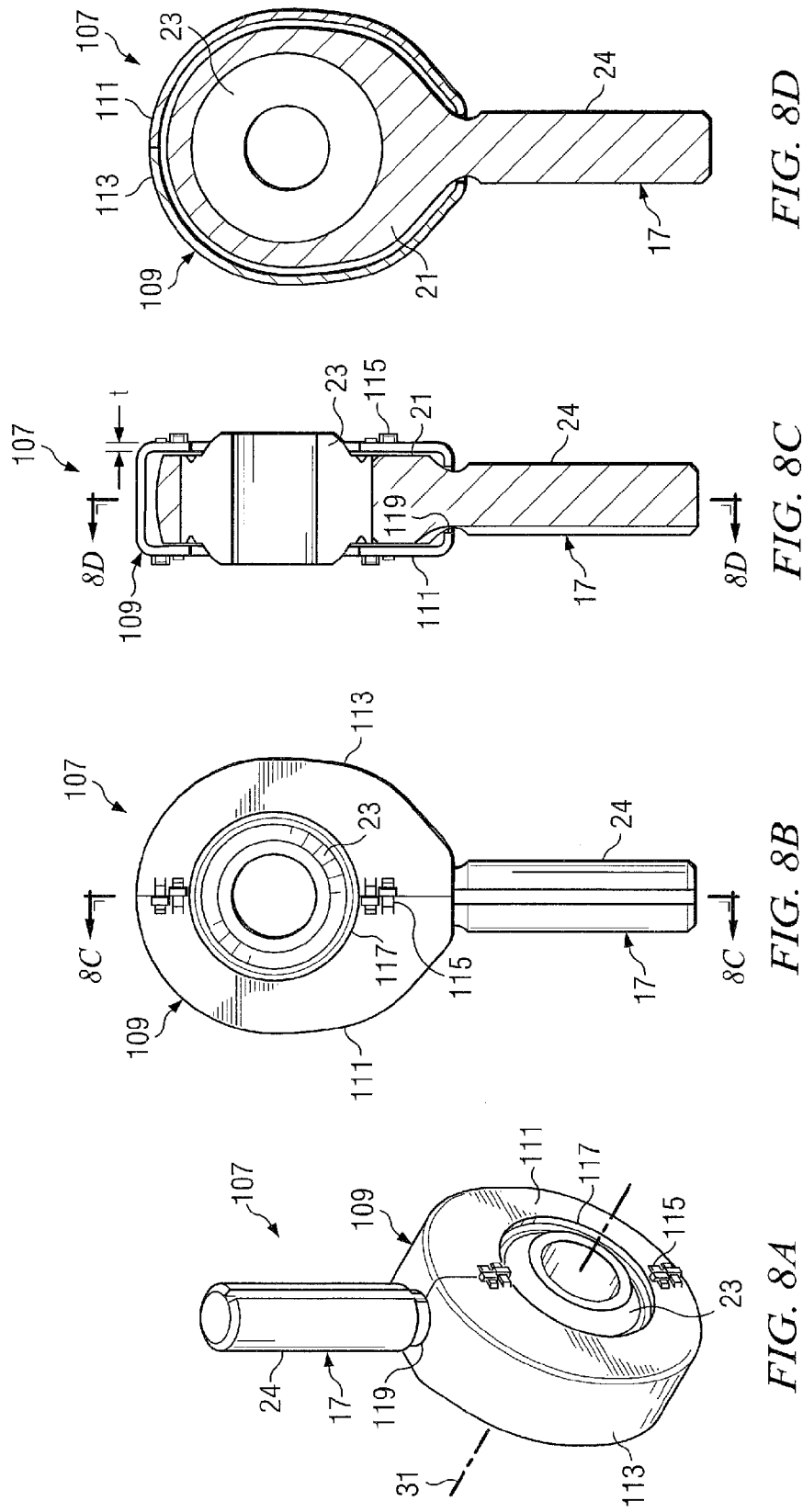

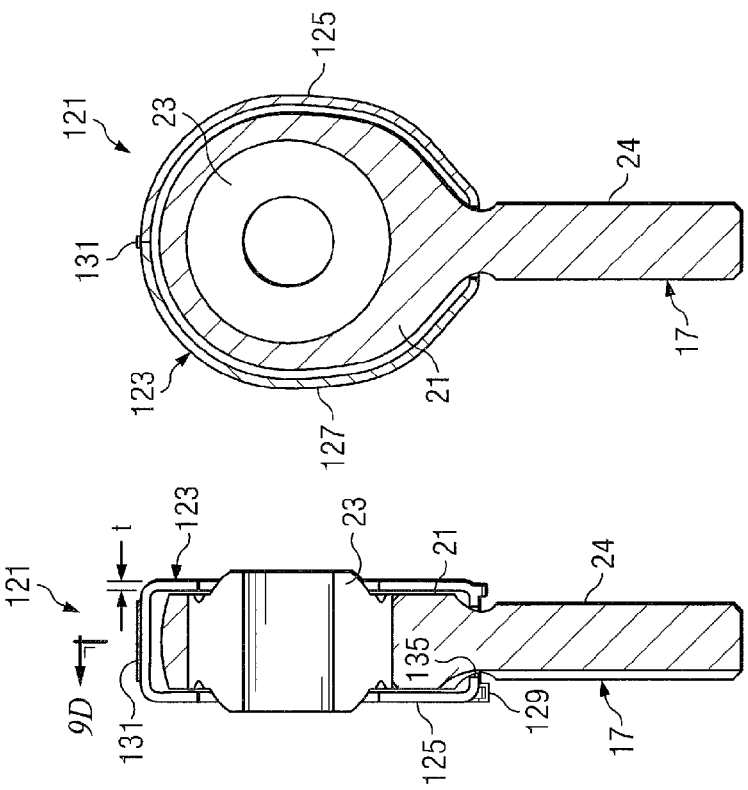
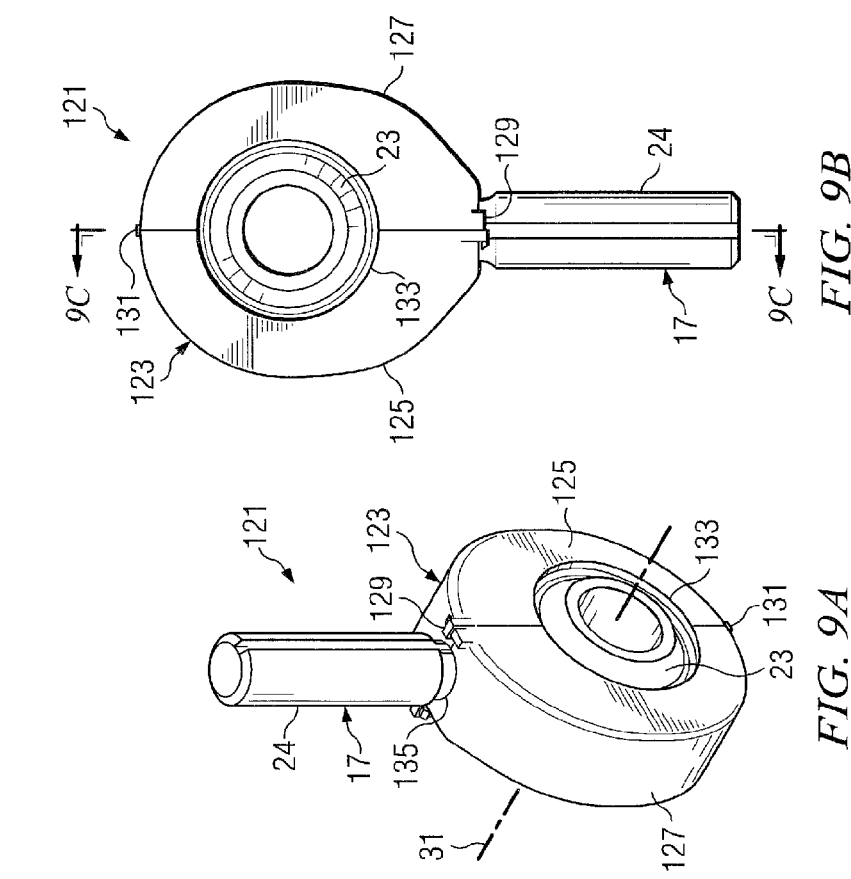

SELF-RETAINING ANTI-ROTATION CLIP

CROSS REFERENCE TO RELATED APPLICATIONS

This application is a divisional of U.S. application Ser. No. 12/523,601, filed 17 Jul. 2009 titled "Self-Retaining Anti-Rotational Clip," which claims the benefit of International PCT Application No. PCT/US07/03597, filed 2 Sep. 2007, titled "Self-Retaining Anti-Rotational Clip," both of which are hereby incorporated by reference for all purposes as if fully set forth herein.

BACKGROUND

1. Field of the Present Description

The technical field is self-retaining anti-rotation clips.

2. Description of Related Art

Spherical bearings are often used to connect objects that move in relation to each other, such as links in a linkage, and the spherical bearings allow for limited relative movement about multiple axes. However, it may be desirable to use spherical bearings without allowing complete freedom of movement about all axes. To limit rotation of spherical bearings used in rod ends, anti-rotation clips have been disclosed in the prior art, such as the clips disclosed in U.S. Pat. No. 4,072,431 to Waight et al. and U.S. Pat. No. 6,371,681 to Covington et al. These anti-rotation clips are distinguishable from protective or cushioning boots for rod ends, such as those disclosed in U.S. Pat. No. 2,064,692 to Shank and U.S. Pat. No. 5,203,522 to White et al.

DESCRIPTION OF THE DRAWINGS

FIGS. 8A through 8D show oblique, side, and sectional views of an assembly of a spherical-bearing rod end and another embodiment of a self-retaining anti-rotation clip.

FIGS. 9A through 9D show oblique, side, and sectional views of an assembly of a spherical-bearing rod end and another embodiment of a self-retaining anti-rotation clip.

DETAILED DESCRIPTION

A self-retaining anti-rotation clip for a spherical bearing limits rotation of the race of the bearing relative to the ball of the bearing when it is installed on the bearing and when the assembly is installed in a clevis or other type of mount. The clip may also be used with a spherical bearing installed in a rod end, wherein the clip limits rotation of the body of the rod end when it is installed on the rod end to form an end assembly and when the end assembly is installed in a clevis or other type of mount.

The clip comprises means for retaining the clip on the spherical bearing or rod end prior to installation of the assembly. The clip is preferably formed from a relatively soft, wearable plastic or a similar elastomeric material, and use of these materials requires a design that differs from previous designs of anti-rotation clips. For example, the sacrificial spacer plates and connector plate of each clip need to have increased surface area to prolong life of the clip and reduce or eliminate wear of the attached components. The embodiments shown in the figures and described below show the use of self-retaining anti-rotation clips with rod ends, but it should be understood that the clips may be used with spherical bearings in other types of appropriate assemblies.

Figure 1:
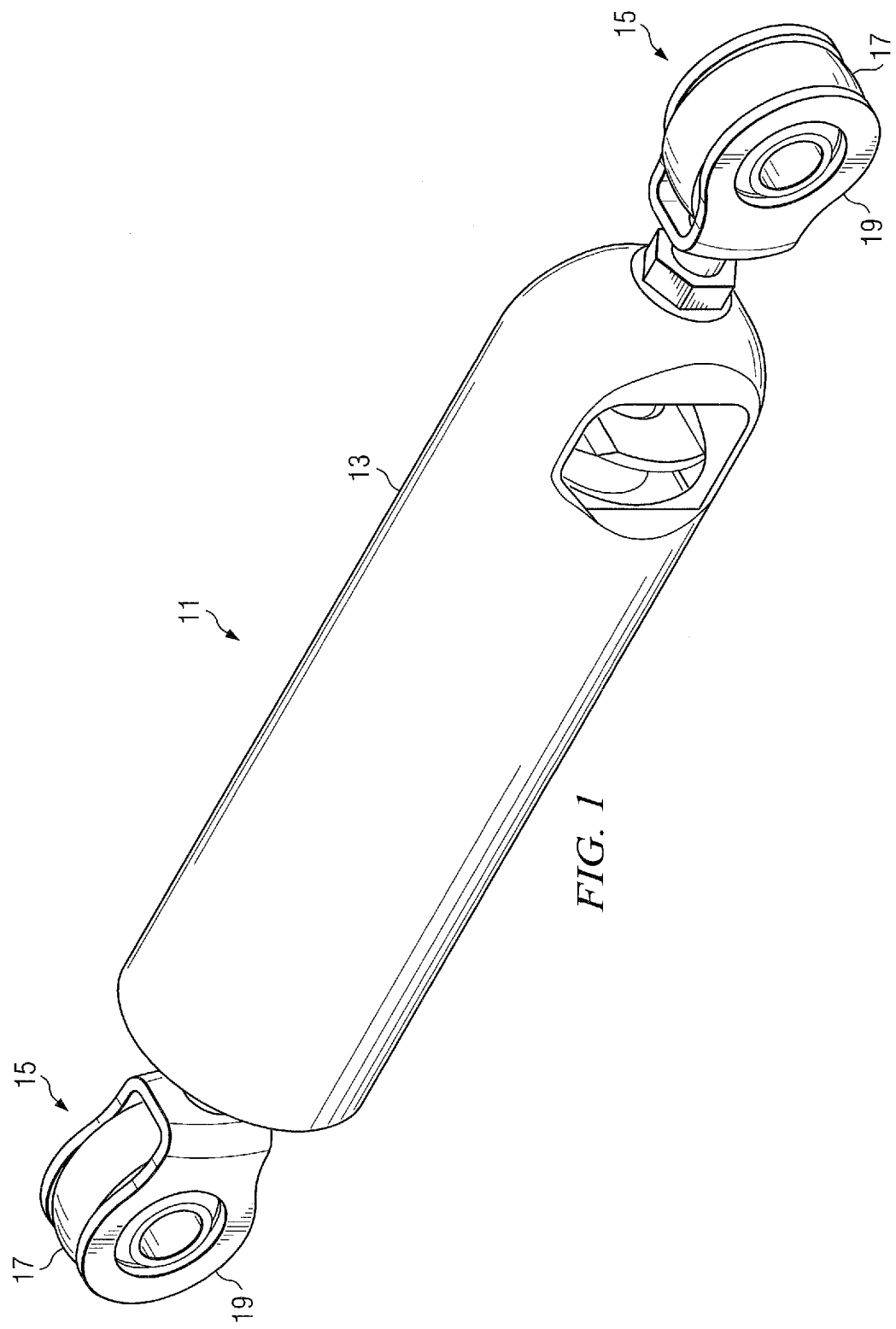
FIG. 1 is an oblique view of a spring-damper assembly having installed thereon self-retaining anti-rotation clips according to a first embodiment.

FIG. 1 shows a spring-damper assembly 11, which comprises a spring-damper 13 and end assemblies 15 located at each end of spring-damper 13. Each end assembly 15 comprises a spherical-bearing rod end 17 and a self-retaining anti-rotation clip 19 assembled onto rod end 17. In the embodiment of FIG. 1, clip 19 is assembled onto rod end 17 prior to attachment of rod end 17 to spring-damper 13.

Figure 2D:
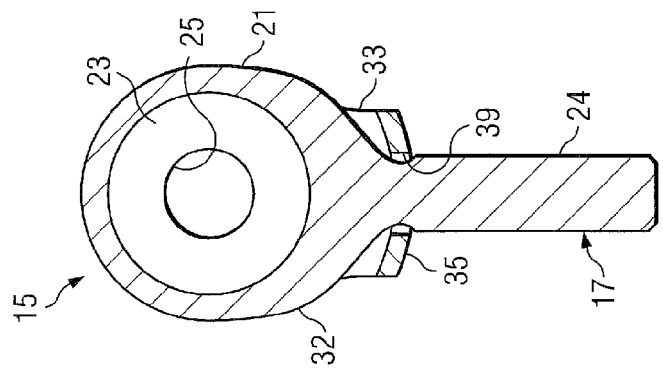
FIGS. 2A through 2D show oblique, side, and sectional views of an assembly of a spherical-bearing rod end and a clip of FIG. 1.
Figure 2C:
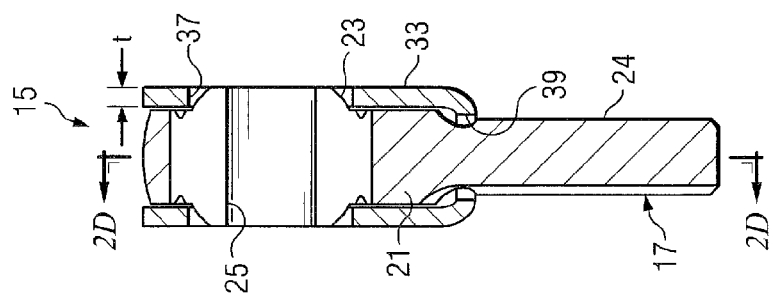
Figure 2B:
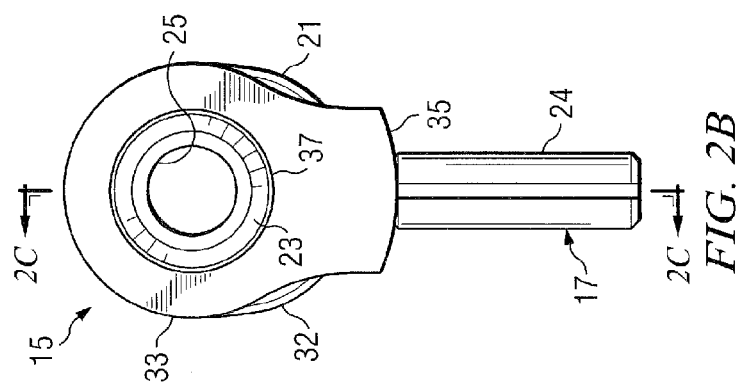
Figure 2A:
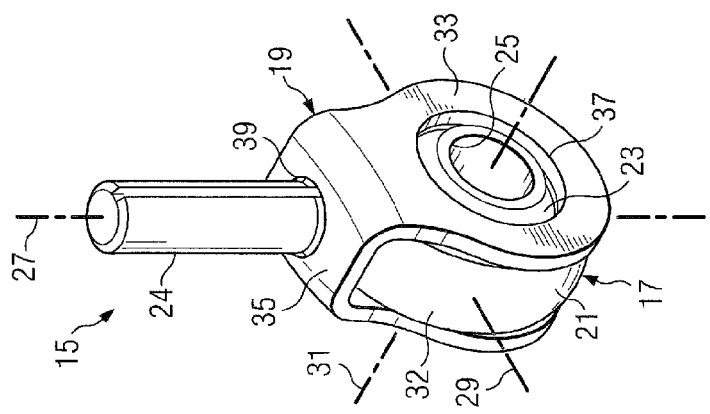
Figure 3:
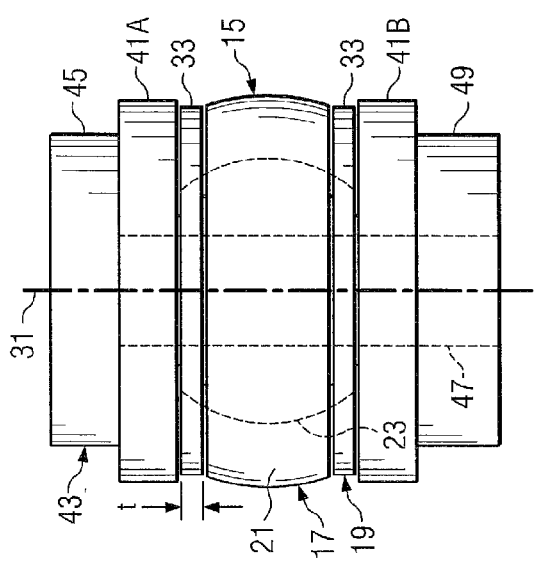
FIG. 3 is an end view of an assembly comprising the rod end and clip of FIGS. 2A through 2D.

FIGS. 2A through 2B show oblique, side, and sectional views of one end assembly 15. Rod end 17 is a spherical-bearing rod end, comprising an outer bearing housing, or race, carried within a rigid body 21, a spherical ball 23 rotatably carried within the outer housing and body 21, and a connector 24 extending from body 21 and configured for attachment to an object. Body 21 is shaped to allow ball 23 to protrude from opposing sides of body 21. Ball 23 is shown with a diametric bore 25 extending through body 23, and bore 25 is configured for receiving a fastener (an example is shown in FIG. 3) for attaching rod end 17 to an object. Ball 23 is capable of rotation within body 21 about axes 27, 29, 31, allowing for relative rotation between body 21 and ball 23. A tapered portion 32 is formed on each side of body 21 that extends to connector 24 and may include a defined shoulder. Clip 19 is configured to be assembled onto rod end 17 for substantially limiting relative rotation between body 21 and ball 23 to rotation primarily about axis 31.

Clip 19 is preferably formed from relatively soft, wearable plastic or a similar elastomeric material and comprises two spacer plates 33, a connector plate 35, and retaining means 37 for retaining clip 19 on rod end 17. Spacer plates 33 are attached to connector plate 35 in a configuration that positions spacer plates 33 apart from each other and orients spacer plates 33 as generally parallel to each other. Connector plate 35 is shown with a curved profile, but connector plate 35 may alternatively be formed to have a profile of another shape. In the embodiment of FIGS. 2A through 2D, spacer plates extend from connector plate 35 for a length that is approximately equal to the length of body 21 of rod end 17. Holes 37 are formed in spacer plates 33 to allow a fastener to pass through clip 19 and ball 23. In addition, an inner edge or surface of each hole 37 encircles the adjacent protruding portion of ball 23 and acts as retaining means for retaining clip 19 on rod end 17. Though shown as having a straight wall, hole 37 may have a tapered or curved wall, such as a chamfer or bevel. Spacer plates 33 have a thickness t, as shown in FIG. 2C, that is preferably less than the distance ball 23 protrudes from each side of body 21. Connector plate 35 also has a hole 39 for receiving connector 24 of rod end 17, and this configuration minimizes rotation of clip 19 relative to body 21.

To install clip 19 on rod end 17, clip 19 is oriented to align connector 24 with hole 39 of connector plate 35. Connector 24 is inserted into hole 39, and rod end 17 and clip 19 are oriented to allow body 21 to slide between spacer plates 33. As the protruding portions of ball 23 engage the outer ends of spacer plates 33, plates 33 elastically deform away from each other, allowing ball 23 to pass between plates 33. Spacer plates 33 spring back toward each other as ball 23 enters holes 37, retaining clip 19 on rod end 17 and positioning spacer plates 33 generally adjacent body 21, as shown in FIG. 2C.

FIG. 3 is an end view of an example installation of an end assembly 15 in a clevis mount formed by clevis portions 41A, 41B. A fastener is used to retain end assembly 15 within clevis portions 41A, 41B. In the example shown, a bolt 43 comprises a head 45 and a shaft 47, which is inserted through clevis portion 41A, through one spacer plate 33, through ball 23, through the other spacer plate 33, and through clevis portion 41B. Shaft may, for example, have external threads (not shown) for engaging threads of a nut 49 on the opposite side of the assembly from head 45. As can be seen in the figure, spacer plates 33 substantially fill the space between an inner face of each clevis portion 41A, 41B and the corresponding side of body 21, limiting rotation of body 21 about axes perpendicular to axis 31 while allowing substantial rotation about axis 31. As mentioned above, thickness t of spacer plates 33 is preferably less than the distance ball 23 protrudes beyond the sides of body 21, and this allows clevis portions 41A, 41B to be tightened against ball 23 while providing clearance for rotation of spacer plates 33 primarily about axis 31 relative to clevis portions 41A, 41B.

Figure 4:
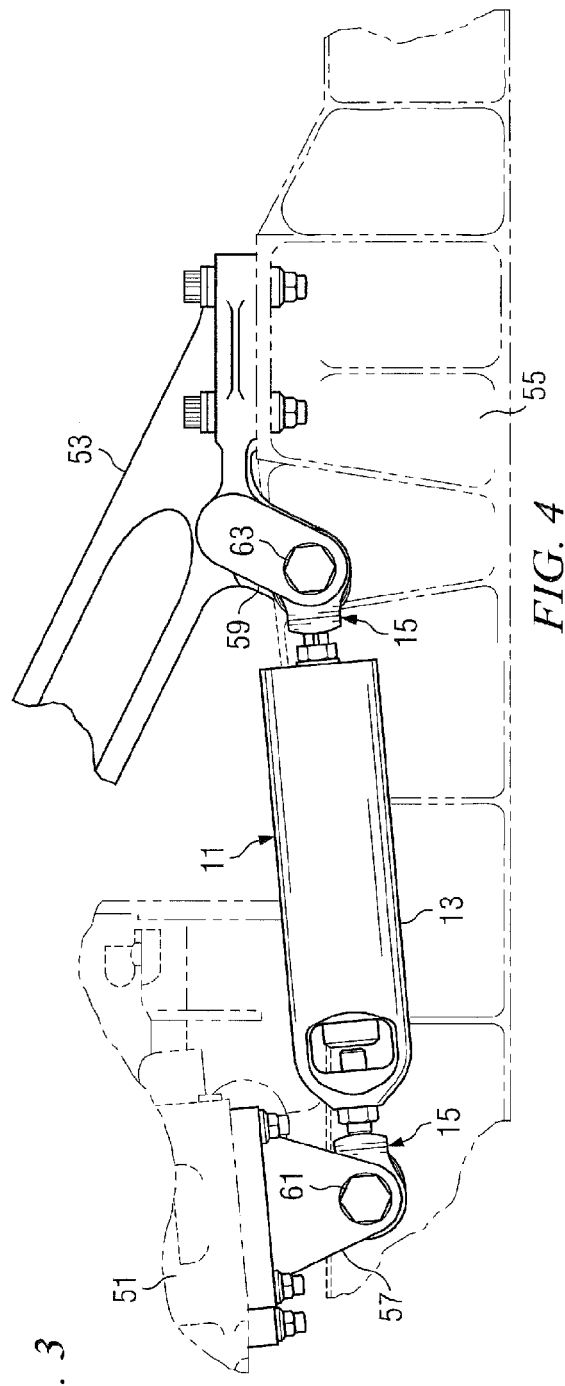
FIG. 4 is a side view of a portion of an aircraft, the spring-damper assembly of FIG. 1 being shown installed on the aircraft.

FIG. 4 is a side view of a portion of an aircraft with an installed spring-damper assembly 11. A transmission 51 for a helicopter is mounted with a transmission support 53 to an airframe 55. Transmission support 53 allows for limited movement of transmission 51 relative to airframe 55, and spring-damper assembly 11 is mounted between transmission 51 and airframe 55 for damping this motion. An end assembly 15, comprising a rod end 17 and a clip 19, is attached to each end of spring-damper 13, and each end assembly 15 is attached to one of a pair of clevises 57, 59. Clevis 57 is attached to transmission 51, and spring-damper assembly 11 is attached to clevis 57 with a fastener 61 in a similar manner as shown in FIG. 3. Likewise, clevis 59 is attached to transmission support 53 and airframe 55, and spring-damper assembly 11 is attached to clevis 59 with fastener 63. Clips 19 maintain body 21 of each rod end 17 in a generally vertical orientation, preventing each body 21 from contacting clevis 57, 59, which may cause binding or undesirable wear of clevises 57, 59 or bodies 21. In this manner clips 19 serve as replaceable, sacrificial elements.

FIGS. 5A through 5D, 6A through 6D, 7A through 7D, 8A through 8D, and 9A through 9D are views of alternate embodiments of self-retaining anti-rotation clips.

Figure 5D:
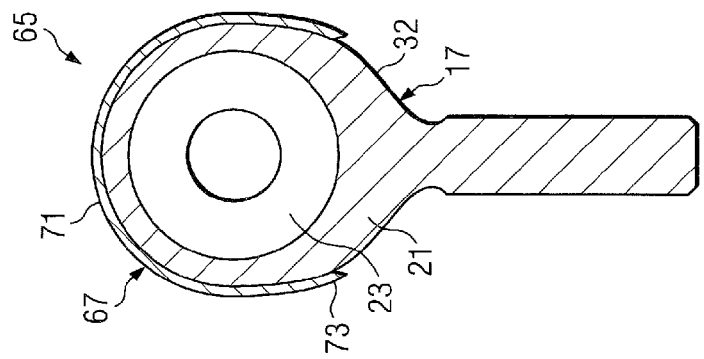
FIGS. 5A through 5D show oblique, side, and sectional views of an assembly of a spherical-bearing rod end and another embodiment of a self-retaining anti-rotation clip.
Figure 5C:
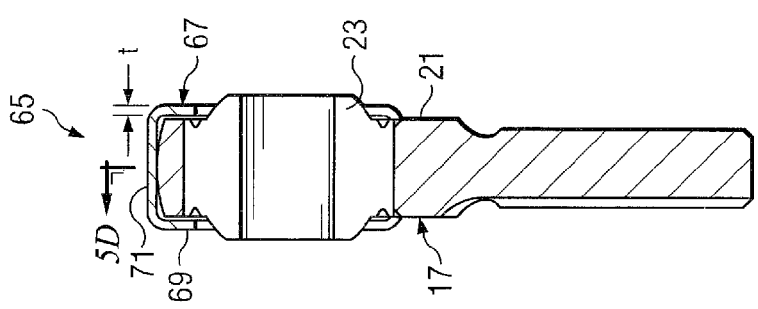
Figure 5B:
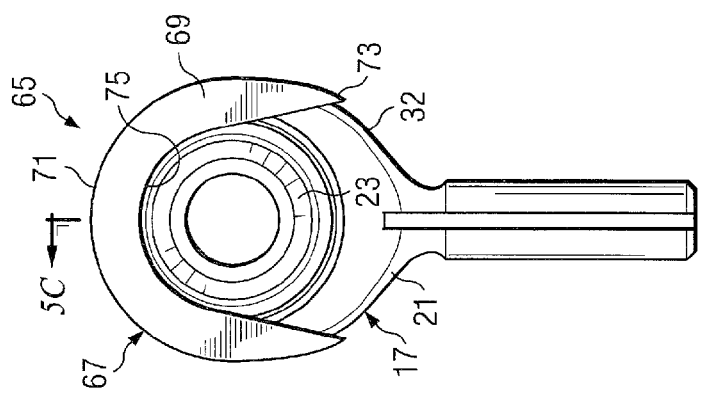
Figure 5A:
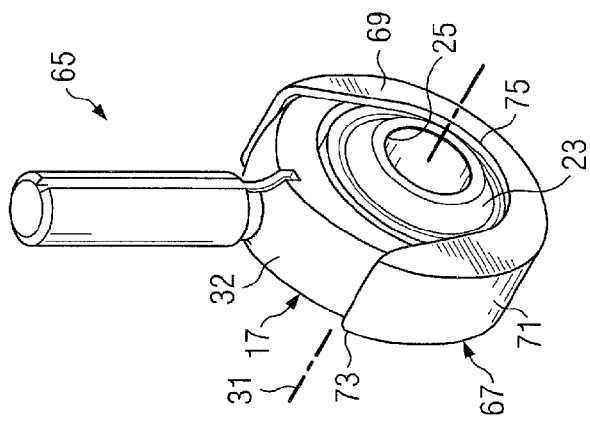

FIGS. 5A through 5D show oblique, side, and sectional views of an end assembly 65, comprising a rod end 17, as described above, and a self-retaining anti-rotation clip 67. Clip 67 is configured to be assembled onto rod end 17 for substantially limiting relative rotation between body 21 and ball 23 to rotation primarily about axis 31. Clip 67 is generally C-shaped and preferably formed from relatively soft, wearable plastic or a similar elastomeric material. Clip 67 comprises two spacer plates 69, a connector plate 71, and retaining means 73 for retaining clip 67 on rod end 17. Spacer plates 69 are attached to connector plate 71 in a configuration that positions spacer plates 69 apart from each other and orients spacer plates 69 as generally parallel to each other. In the embodiment of FIGS. 5A through 5D, spacer plates extend from connector plate 71 for only a portion of the length of body 21 of rod end 17. An inner edge 75 is formed on spacer plates 69, the inner edge 75 partially surrounding the adjacent protruding portion of ball 23. Spacer plates 33 have a thickness t, as shown in FIG. 5C, that is preferably less than the distance ball 23 protrudes from each side of body 21. A lip 73 is formed on each end of connector plate 71, and each lip 73 engages tapered portion 32 to retain clip 67 on rod end 17. As shown, lips 73 engage a shoulder of tapered portion 32, though a shoulder is not required. The shape of connector plate 71 cooperates with lips 73 to minimize rotation of clip 67 relative to body 21.

To install clip 67 on rod end 17, clip 67 is oriented to allow body 21 to slide between spacer plates 69. As lips 73 engage body 21, lips 73 elastically deform away from each other, allowing body 21 to pass between lips 73. Lips 73 spring back toward each other as the widest portion of body 21 passes lips 73, as shown in FIG. 5D, retaining clip 67 on rod end 17 and positioning spacer plates 69 generally adjacent body 21, as shown in FIG. 5C.

Figure 6D:
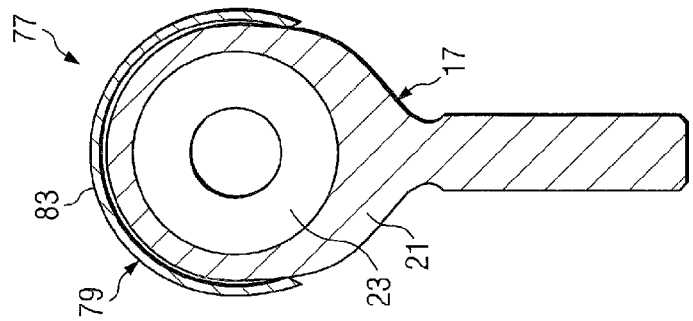
FIGS. 6A through 6D show oblique, side, and sectional views of an assembly of a spherical-bearing rod end and another embodiment of a self-retaining anti-rotation clip.
Figure 6C:
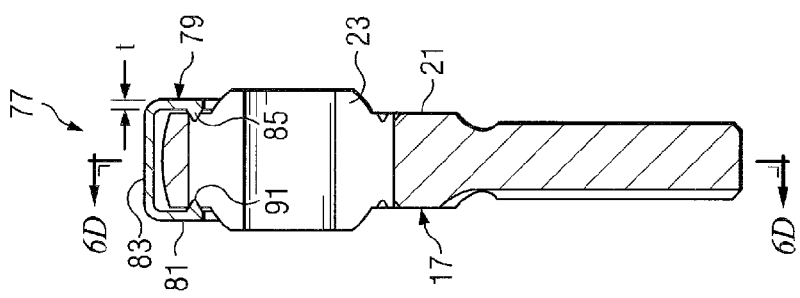
Figure 6B:
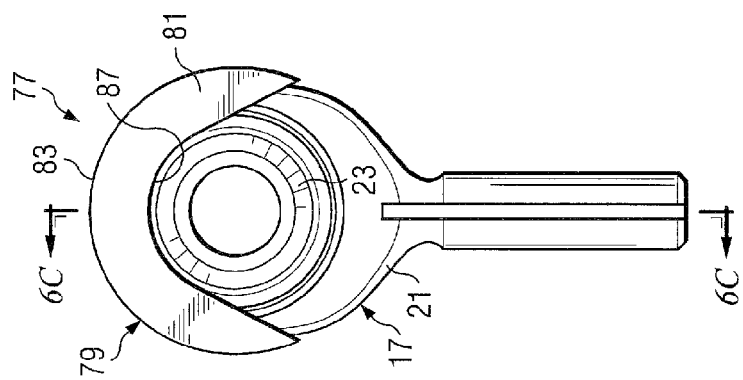
Figure 6A:
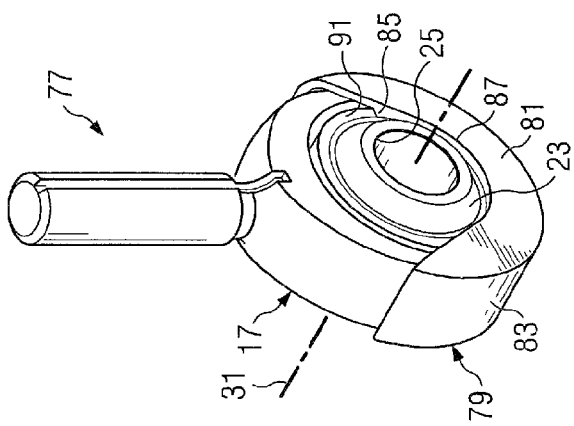

FIGS. 6A through 6D show oblique, side, and sectional views of an end assembly 77, comprising a rod end 17, as described above, and a self-retaining anti-rotation clip 79. Clip 79 is configured to be assembled onto rod end 17 for substantially limiting relative rotation between body 21 and ball 23 to rotation primarily about axis 31. Clip 79 is generally C-shaped and preferably formed from relatively soft, wearable plastic or a similar elastomeric material. Clip 79 comprises two spacer plates 81, a connector plate 83, and retaining means 85 for retaining clip 79 on rod end 17. Spacer plates 81 are attached to connector plate 83 in a configuration that positions spacer plates 81 apart from each other and orients spacer plates 81 as generally parallel to each other. In the embodiment of FIGS. 6A through 6D, spacer plates extend from connector plate 83 for only a portion of the length of body 21 of rod end 17. An inner edge 87 is formed on spacer plates 81, the inner edge 87 partially surrounding the adjacent protruding portion of ball 23. Spacer plates 81 have a thickness t, as shown in FIG. 6C, that is preferably less than the distance ball 23 protrudes from each side of body 21. To retain clip 79 on rod end 17, a lip 85 is formed on an inner surface of each spacer plate 81 that engages a curved inner surface 91, such as a staking groove, of body 21. As shown, each lip 85 is formed as a curve to generally mimic the curvature of inner surface 91. The shape of connector plate 83 cooperates with lips 85 to minimize rotation of clip 79 relative to body 21.

To install clip 79 on rod end 17, clip 79 is oriented to allow body 21 to slide between spacer plates 81. As lips 85 engage body 21, spacer plates 81 elastically deform away from each other, allowing body 21 to pass between lips 85. Spacer plates 81 spring back toward each other as lips 85 pass inner surface 91, as shown in FIG. 6C, retaining clip 79 on rod end 17 and positioning spacer plates 81 generally adjacent body 21, also shown in FIG. 6C.

Figure 7D:
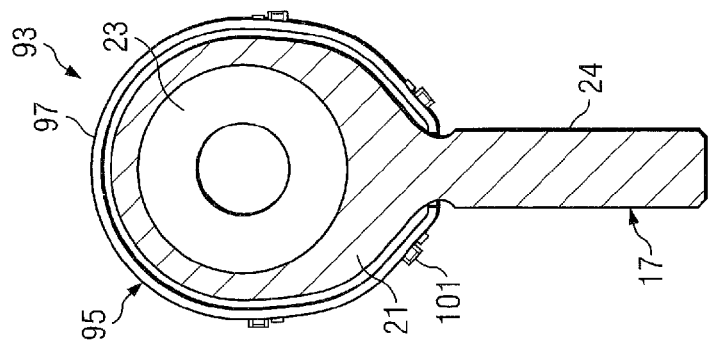
FIGS. 7A through 7D show oblique, side, and sectional views of an assembly of a spherical-bearing rod end and another embodiment of a self-retaining anti-rotation clip.
Figure 7C:
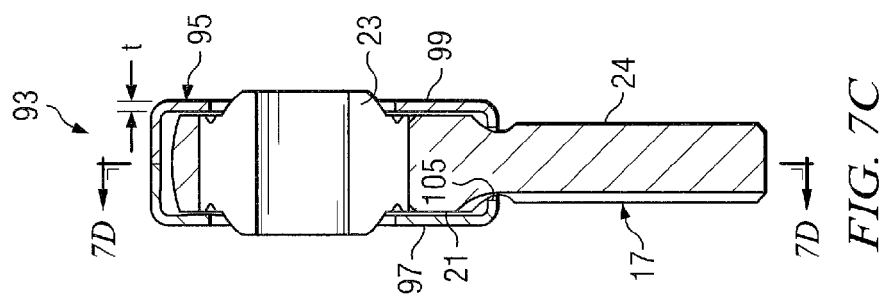
Figure 7B:
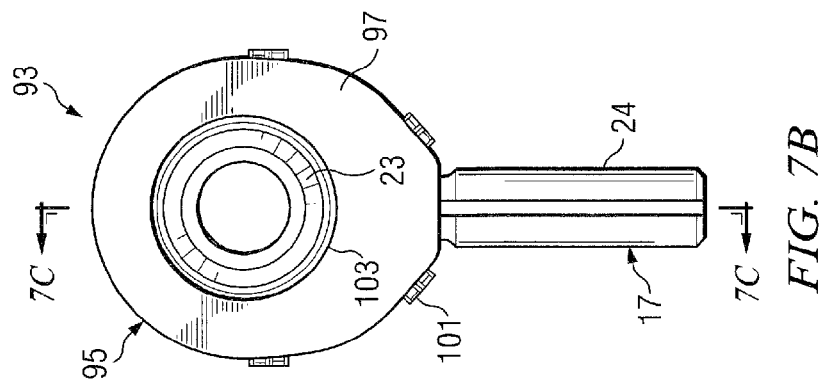
Figure 7A:
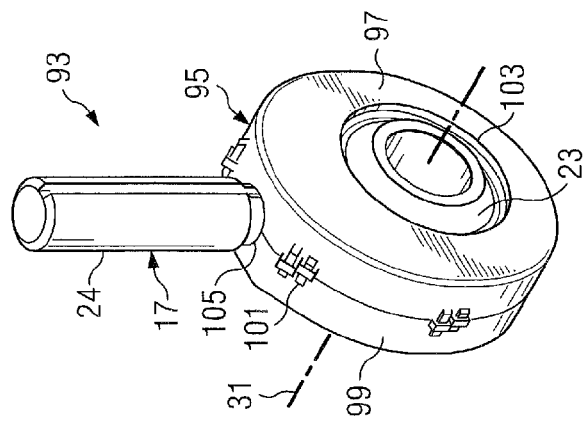

FIGS. 7A through 7D show oblique, side, and sectional views of an end assembly 93, comprising a rod end 17, as described above, and a self-retaining anti-rotation clip 95. Clip 95 is configured to be assembled onto rod end 17 for substantially limiting relative rotation between body 21 and ball 23 to rotation primarily about axis 31. Clip 95 comprises two preferably identical pieces and is preferably formed from relatively soft, wearable plastic or a similar elastomeric material. In the embodiment shown, the two pieces of clip 95 are formed by bisecting clip 95 with a plane normal to axis 31. Each piece of clip 95 comprises a spacer plate 97, half of connector plate 99, and retaining means 101 for retaining clip 95 on rod end 17. Each spacer plate 97 is attached to the associated half of connector plate 99 in a configuration that positions spacer plates 97 apart from each other and orients spacer plates 97 as generally parallel to each other. In the embodiment of FIGS. 7A through 7D, the pieces of clip 95 assemble to form an enclosure around rod end 17, and each piece has a hole 103 encircling the associated protruding portion of ball 23. Spacer plates 97 have a thickness t, as shown in FIG. 7C, that is preferably less than the distance ball 23 protrudes from each side of body 21. To retain clip 95 on rod end 17, cooperating tab fasteners 101 are formed on each piece of clip 95, each portion of tab fasteners 101 on one piece of clip 95 engaging a corresponding portion on the other piece of clip 95 to retain the pieces together. Connector plate 99 has a hole 105 for receiving connector 24 of rod end 17, one half of hole 105 being formed in each piece of clip 95. This configuration minimizes rotation of clip 95 relative to body 21. To install clip 95 on rod end 17, each piece of clip 95 is oriented to align with the appropriate features of rod end 17 and the pieces are snapped together using tab fasteners 101. This positions spacer plates 97 generally adjacent body 21, also shown in FIG. 7C.

FIGS. 8A through 8D show oblique, side, and sectional views of an end assembly 107, comprising a rod end 17, as described above, and a self-retaining anti-rotation clip 109. Clip 109 is configured to be assembled onto rod end 17 for substantially limiting relative rotation between body 21 and ball 23 to rotation primarily about axis 31. Clip 109 comprises two preferably identical pieces and is preferably formed from relatively soft, wearable plastic or a similar elastomeric material. In the embodiment shown, the two pieces of clip 109 are formed by bisecting clip 109 with a plane that contains axis 31 and bisects body 21 of rod end 17. Each piece of clip 109 comprises half of each spacer plate 111, half of connector plate 113, and half of retaining means 115 for retaining clip 109 on rod end 17. Each half of spacer plate 111 is attached to the associated half of connector plate 113 in a configuration that positions spacer plates 111 apart from each other and orients spacer plates 111 as generally parallel to each other. In the embodiment of FIGS. 8A through 8D, the pieces of clip 109 assemble to form an enclosure around rod end 17, and each piece has half of each of two holes 117 encircling the associated protruding portion of ball 23. Spacer plates 111 have a thickness t, as shown in FIG. 8C, that is preferably less than the distance ball 23 protrudes from each side of body 21. To retain pieces of clip 109 to each other and retain clip 109 on rod end 17, cooperating tab fasteners 115 are formed on each piece of clip 109, each portion of tab fasteners 115 on one piece of clip 109 engaging a corresponding portion on the other piece of clip 109 to retain the pieces together. Connector plate 113 has a hole 119 for receiving connector 24 of rod end 17, one half of hole 119 being formed in each piece of clip 109. This configuration minimizes rotation of clip 109 relative to body 21. To install clip 109 on rod end 17, each piece of clip 109 is oriented to align with the appropriate features of rod end 17 and the pieces are snapped together using tab fasteners 115. This positions spacer plates 111 generally adjacent body 21, also shown in FIG. 8C.

FIGS. 9A through 9D show oblique, side, and sectional views of an end assembly 121, comprising a rod end 17, as described above, and a self-retaining anti-rotation clip 123. Clip 123 is configured to be assembled onto rod end 17 for substantially limiting relative rotation between body 21 and ball 23 to rotation primarily about axis 31. Clip 123 comprises two preferably identical sides and is preferably formed from relatively soft, wearable plastic or a similar elastomeric material. In the embodiment shown, the two sides of clip 123 are formed by bisecting clip 123 with a plane that contains axis 31 and bisects body 21 of rod end 17. Each side of clip 123 comprises half of each spacer plate 125, half of connector plate 127, and half of retaining means 129 for retaining clip 123 on rod end 17. Each half of spacer plate 125 is attached to the associated half of connector plate 127 in a configuration that positions spacer plates 125 apart from each other and orients spacer plates 125 as generally parallel to each other. In the embodiment of FIGS. 9A through 9D, the sides of clip 123 are connected to each other with an integral hinge 131, and the sides close in a "clamshell" manner to form an enclosure around rod end 17. Each side has half of each of two holes 133 encircling the associated protruding portion of ball 23. Spacer plates 125 have a thickness t, as shown in FIG. 9C, that is preferably less than the distance ball 23 protrudes from each side of body 21. To retain sides of clip 123 to each other and retain clip 123 on rod end 17, cooperating tab fasteners 129 are formed on each side of clip 123, each portion of tab fasteners 129 on one side of clip 123 engaging a corresponding portion on the other side of clip 123 to retain the sides together. Connector plate 127 has a hole 135 for receiving connector 24 of rod end 17, one half of hole 135 being formed in each side of clip 123. This configuration minimizes rotation of clip 123 relative to body 21. To install clip 123 on rod end 17, clip 123 is oriented to align the sides with the appropriate features of rod end 17 and the sides are hinged toward each other and snapped together using tab fasteners 129. This positions spacer plates 125 generally adjacent body 21, also shown in FIG. 9C. Though shown with hinge 131 being formed on an end of clip 123, hinge 131 may be formed in another location or orientation on clip 123.

It should be noted that each of the features shown in the embodiments described above may be used in combination with features shown in another embodiment. For example, a lip, configured like lip 85 of FIGS. 6A through 6D, may be used on any of the embodiments to assist in locating the clip on the rod end. It should also be noted that clips 95, 109, and 123 are shown and described as preferably being bisected into identical sides or pieces, though it is not required that the sides or pieces be identical. Clips 95, 109, 123 may be formed to have non-identical sides or pieces, wherein unequal portions of connector plates, spacer plates, or other features, such as holes, may be formed on the sides or pieces.

The self-retaining anti-rotation clip provides for several advantages, including: (1) the clip remains assembled on a spherical bearing or rod end when the bearing or rod end is detached from another object; (2) the clip has low weight and cost through the use of plastic or elastomeric material; (3) the clip is easy to install and uninstall; (4). the clip requires no modification to the spherical bearing, rod end, or clevis portions; and (5) the clip is sacrificial. When sufficient clearance around rod end 17 exists, clips 67, 79, 109, and 123 have the additional advantage of being installable or replaceable without the need to disassemble rod end 17 from the associated clevis.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

What is claimed is:

1. A self-retaining anti-rotation clip for a spherical-bearing rod end, the rod end comprising a body and a spherical ball rotatably carried within the body, the rod end also having a connector for attaching the rod end to another object, the clip comprising:

first and second completely separable opposing spacer plates, each spacer plate having a curved edge portion adapted for surrounding at least a portion of a ball of a rod end;

a connector plate connecting the spacer plates comprising a first half extending from the first spacer plate and a second half extending from the second spacer plate, such that the spacer plates are spaced from each other and generally parallel to each other and that the first spacer plate and the first half of the connector plate are identical in shape and size to the second spacer plate and the second half of the connector plate;

a fastener attached to an outer surface of the clip and configured to secure each spacer plate to each other in a position generally adjacent one side of a body of the rod end, such that the spacer plates are free from interference with the ball of the rod end, the fastener having:

a first tab positioned on and protruding from an outer surface of the first half of the connector plate; and a second tab positioned on and protruding from an outer surface of the second half of the connector plate;

wherein the first tab is configured to snap into the second tab, which in turn retains the spacer plates in a fixed position relative to each other; and a hole formed by the connector plate for receiving the connector of the rod;

wherein the two spacer plates are substantially planar and are secured together solely by the fastener;

wherein any cross section of each the clip in a plane parallel to the spacer plates defines a strictly convex space or shape such that the two spacer plates and the connector plate are configured to solely surround the entire body of the rod end.

2. The self-retaining anti-rotation clip according to claim 1, wherein the clip is adapted to substantially enclose the body of the rod end.

3. A self-retaining anti-rotation clip for a spherical bearing, the spherical bearing comprising an outer housing and a spherical ball rotatably carried within the housing, the clip comprising:

first and second completely separable opposing spacer plates, each spacer plate having a curved edge portion adapted for surrounding at least a portion of a ball of a spherical bearing;

a connector plate connecting the spacer plates comprising a first half extending from the first spacer plate and a second half extending from the second spacer plate, such that the spacer plates are spaced from each other and generally parallel to each other and that the first spacer plate and the first half of the connector plate are identical in shape and size to the second spacer plate and the second half of the connector plate; and a fastener attached to an outer surface of the clip and configured to secure each spacer plate in a position generally adjacent one side of an outer housing of the spherical bearing, such that the spacer plates are free from interference with the ball of the spherical bearing, the fastener having:

a first tab positioned on and protruding from an outer surface of the first half of the connector plate; and a second tab positioned on and protruding from an outer surface of the second half of the connector plate;

wherein the first tab is configured to snap into the second tab, which in turn retains the opposing plates in a fixed position relative to each other;

wherein the two spacer plates are substantially planar and are secured together solely by the fastener;

wherein any cross section of each the clip in a plane parallel to the spacer plates defines a strictly convex space or shape such that the two spacer plates and the connector plate are configured to solely surround the entire body of the outer housing.

4. The self-retaining anti-rotation clip according to claim 3, wherein the curved edge of each spacer plate defines a hole.

5. The self-retaining anti-rotation clip according to claim 3, wherein the curved edge of each spacer plate defines a hole; and wherein the hole in each spacer plate is adapted to encircle the ball of the spherical bearing.

6. The self-retaining anti-rotation clip according to claim 3, wherein the clip is adapted to substantially enclose the spherical bearing.

* * * * *